United States Patent [19]

Wade

[11] 4,128,204
[45] Dec. 5, 1978

[54] INHABITABLE ENCLOSURE AND METHODS RELATING THERETO

[76] Inventor: Glenn C. Wade, 313 Highland, Paragould, Ark. 72450

[21] Appl. No.: 766,983

[22] Filed: Jun. 2, 1977

[51] Int. Cl.² .............................................. F24J 3/02
[52] U.S. Cl. ................................... 237/1 A; 126/270; 126/400; 52/2
[58] Field of Search .................... 237/1 A; 165/45; 62/260; 126/400, 270; 52/2

[56] References Cited

U.S. PATENT DOCUMENTS

| | | | |
|---|---|---|---|
| 2,559,870 | 7/1951 | Gay | 237/1 A X |
| 2,584,573 | 2/1952 | Gay | 62/260 X |
| 3,048,375 | 8/1962 | Walker | 126/270 X |
| 3,353,309 | 11/1967 | Kwake | 52/2 |
| 3,527,921 | 9/1970 | Voglesonger | 165/45 X |
| 3,836,417 | 9/1974 | Yaeger | 52/2 X |
| 3,964,678 | 6/1976 | O'Hanlon | 237/1 A |

Primary Examiner—William E. Wayner
Assistant Examiner—William E. Tapolcai, Jr.
Attorney, Agent, or Firm—Stephen D. Carver

[57] ABSTRACT

An environmentally conditioned enclosure adapted for human habitation and construction methods relating to same. A foundation comprised of thermally insulative material provides support for a shelter erected thereon, and dividably defines a separate geothermal heat exchange region isolated from surrounding ground. The foundation is located within a trench which must be excavated around the separate geothermal region. A geothermal heat exchanger buried within this separate region receives fluids circulated between it and the shelter. By locating the geothermal heat exchanger apparatus in an underground region separate from surrounding ground, an enhanced time lag between variations in outside surface temperature and variations in underground temperatures is achieved. The shelter is preferably secured to the foundation by a liquid anchor received within a channel provided in the foundation. The shelter may include a plurality of blinds deployable in sunlight admitting, solar energy reflecting, and solar energy absorbing positions.

32 Claims, 11 Drawing Figures

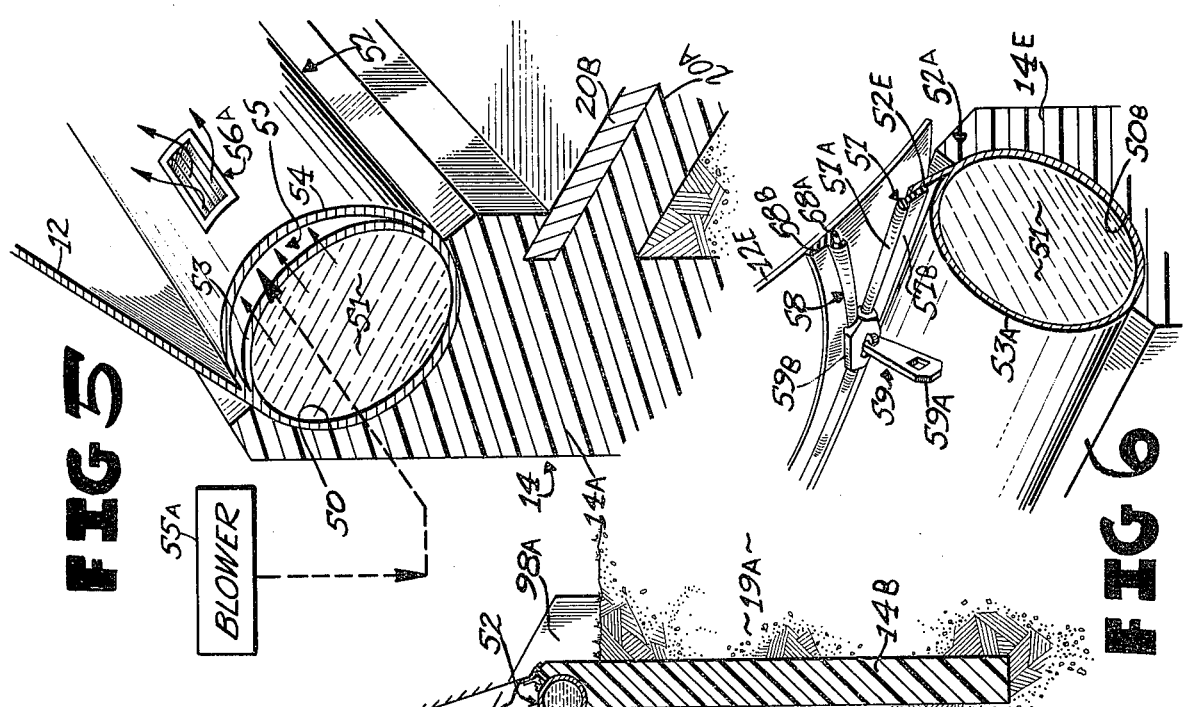
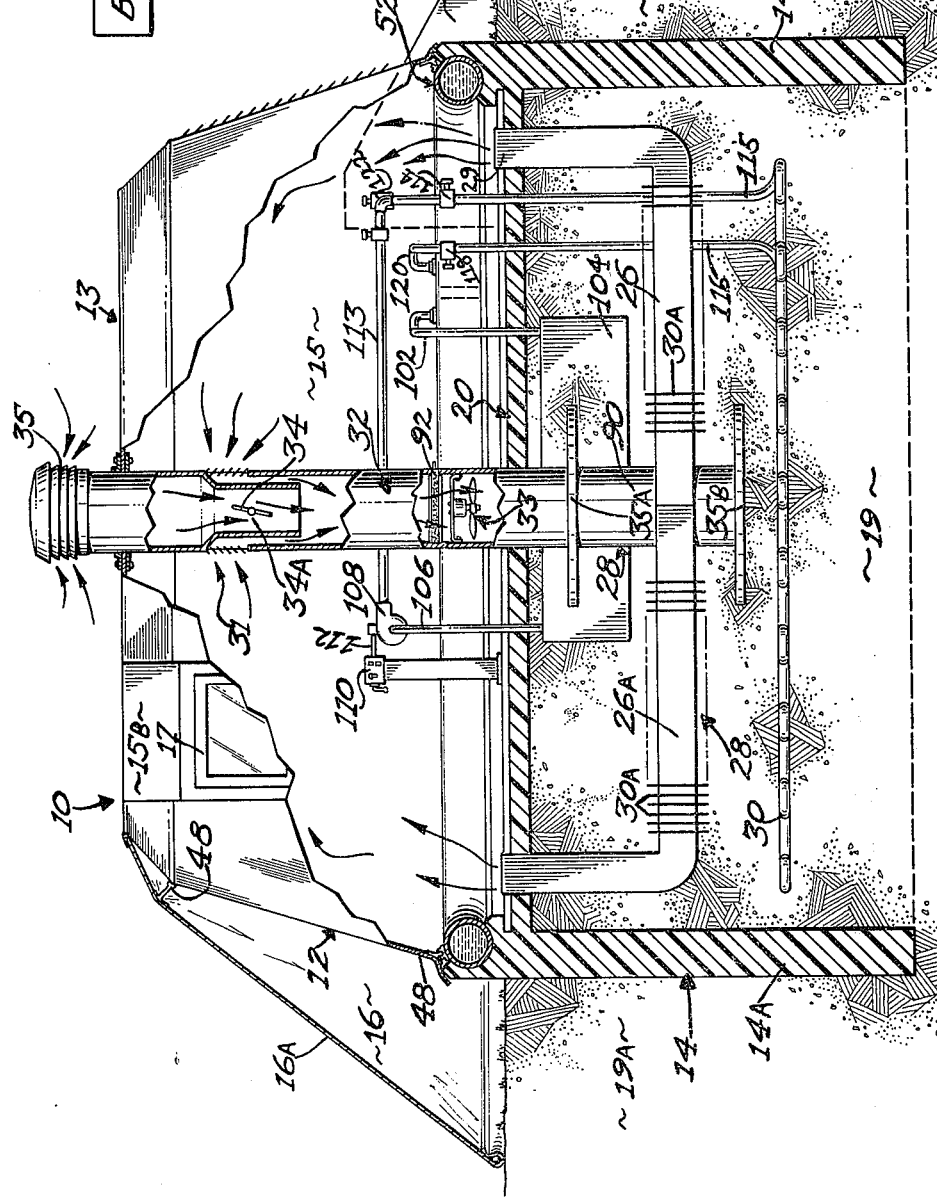

INHABITABLE ENCLOSURE AND METHODS RELATING THERETO

BACKGROUND OF THE INVENTION

This invention relates generally to the use of geothermal and solar energy. More particularly, the instant invention relates to the use of geothermal and/or solar energy to environmentally condition the interior of an inhabitable enclosure.

The shortage of fuels such as gas and oil has made it quite apparent that alternative energy sources for residential and industrial heating and cooling applications must be developed. The winter of 1977 has suggested that radical changes may be necessary in design concepts conventionally associated with residential structures.

In the prior art it has long been known that geothermal and/or solar energy systems can replace fossil fuels to a certain extent. Solar energy has been used in the past to generate electricity, to provide heating internally of "greenhouse" enclosures, and to selectively provide illumination inside dwellings and the like. Geothermal energy has also been successfully employed with heating and cooling systems. Usually some form of ductwork is buried underground and connected in fluid flow communication with the enclosure interior. Alternatively, the entire enclosure may be erected underground to take advantage of natural heating and cooling effects. Even when the underground temperature is insufficient for comfort within an enclosure, geothermal heat exchanger systems may save significant amounts of energy by pre-heating or pre-cooling air within the enclosure. Examples of known prior art relevant to the latter discussion may be seen in an article entitled "Underground Houses," appearing at page 84 of the Apr., 1977 edition of *Popular Science* magazine; and at page 62 of the Spring/Summer edition of the magazine *Home Building and Remodeling*.

As is well known in the art, the outside ground surface temperature tends to vary widely, while the temperature a few feet below the surface tends to be more constant. For example, the average surface temperature recorded during a five year period at Lexington Kentucky varied between a July peak of approximately 85° and a January low of approximately 35°. The temperature ten feet below the ground varied between a 50° low in April and an approximately 65° high at the end of September. Thus the temperature variation below the surface is less extreme than the surface temperature variation. It is also clear that the underground temperature variation "lags" the variation in surface temperature. For most locations this lag is approximately 3 months.

The aforementioned time lag is suggestive of a problem often associated with conventional geothermal energy systems. The peak temperatures in the underground region in which the heat exchanger may be located occur approximately 3 months after peak surface temperatures, for example, so that this time lag does provide a certain advantage when attempting to heat a structure with geothermal energy energy when outside surface temperatures are declining. However, it is apparent that if the time lag could be extended, so that peak underground temperatures would occur closer in time to minimum surface temperatures, geothermal heating systems would be improved significantly. Obviously an increased time lag would benefit geothermal cooling systems as well.

A serious problem with conventional housing is that erection costs are increasing so rapidly that more and more people are virtually priced out of the market. The significant costs in heating or cooling a typical residence through conventional techniques are also becoming prohibitive. When steps are taken to adapt conventional housing designs to reduce energy consumption the costs associated with necessary modifications are enormous. Inexpensive alternatives to the conventional one-family dwelling, such as the increasingly popular mobile home, for example, are often notoriously vulnerable to high winds, tornadoes, hail storms and the like. It is also widely recognized that conventional low cost housing approaches are usually aesthetically inferior.

SUMMARY OF THE INVENTION

The instant invention comprises an environmentally conditioned inhabitable enclosure and methods of constructing same. Geothermal energy derived within an underground region separated from surrounding ground is employed to condition the enclosure interior. Solar energy may also be used as desired.

The enclosure preferably comprises an inhabitable shelter adapted to be formed from inexpensive plastic materials. The shelter is erected upon a foundation comprised of thermally insulative material substantially buried within a trench excavated prior to erection. The foundation substantially encircles, and thereby dividably defines, a separate geothermal heat exchange region isolated from surrounding ground. In this manner an enhanced time lag between outside surface temperature variations and variations in underground temperature is achieved. Geothermal heat exchanger apparatus buried within the separate underground heat exchange region may receive circulated fluids which are utilized to control internal shelter temperature.

The shelter is preferably provided with a plurality of selectively adjustable blinds which permit the user to vary the internal use of solar energy or light. The blinds may be positioned in an "open" position to admit sunlight and solar energy into the enclosure; or they may be positioned in either of two "closed" positions. In a first closed position a substantially black blind surface is turned toward the sun to generate heat. Heated air will be captured between the blinds and a translucent shield suspended thereabove. In a second closed blind position a reflective blind layer is turned toward the sun to facilitate cooling.

In one form of the invention a liquid anchor is employed to secure the foundation. The anchor is in the form of an elongated tube which may be filled with water or the like, and it is preferably matingly received within a channel defined at the top of the foundation. The shelter is thus secured to the foundation by the weight of the liquid therewithin, and it is thus highly resistant to forces of nature such as high winds, hail and the like. It is contemplated that liquid may be circulated between the anchor and either solar or geothermal heat exchanger apparatus to aid in warming or cooling of the shelter interior. Valve means are included to control liquid circulation. In an alternative form of the instant invention a greenhouse barrier may be included to provide a thermal barrier between the enclosure and the outside.

Methods for erecting the previously discussed enclosure and for generating the aforementioned geothermal energy time lag are also disclosed herein.

Thus a very broad object of this invention is to provide an environmentally conditioned inhabitable enclosure which may be heated or cooled by geothermal and/or solar energy.

Another important object of this invention is to increase the efficiency of a geothermal temperature control system. An important feature of this invention is that a separate geothermal heat exchange region is defined by the foundation, thereby facilitating enhancement of the previously discussed time lag between surface and underground temperature variations.

Still another object of the instant invention is to provide and enclosure of the type described which may be constructed very quickly and inexpensively from readily available materials.

Yet another object of this invention is to enhance the cooling and heating efficiency in an enclosure of the type described.

A still further object is to reduce the costs of heating and cooling an inhabitable enclosure.

Another object of the present invention is to provide an enclosure and a method of making such an enclosure which will be highly resistant to high winds, hail stroms and the like. It is an important feature of this invention that stability is enhanced by an optional liquid anchor system preferably received within a predefined channel.

Yet another object is to provide a method of constructing an enclosure of the type described.

A still further object is to provide a method whereby the time lag between outside surface temperature variations and underground temperature variations may be enhanced. Thus a similar object is to increase the utility of geothermal heating and cooling systems.

These and other objects and advantages of this invention, along with features of novelty appurtenant thereto, will appear or become apparent from the following drawings.

BRIEF DESCRIPTION OF THE DRAWINGS

In the following drawings, which form a part of the specification and are to be construed in conjunction therewith, and in which like reference numerals have been employed throughout to indicate like parts in the various views:

FIG. 2 is a side plan view of the enclosure of FIG. 1, with parts thereof broken away or shown in section for clarity;

FIG. 5 is an enlarged, sectional view of the enclosure foundation showing the liquid anchor in detail;

FIG. 6 is an enlarged perspective view of the tongue and groove means for attaching shelter walls;

DETAILED DESCRIPTION OF THE DRAWINGS

Figure 1:
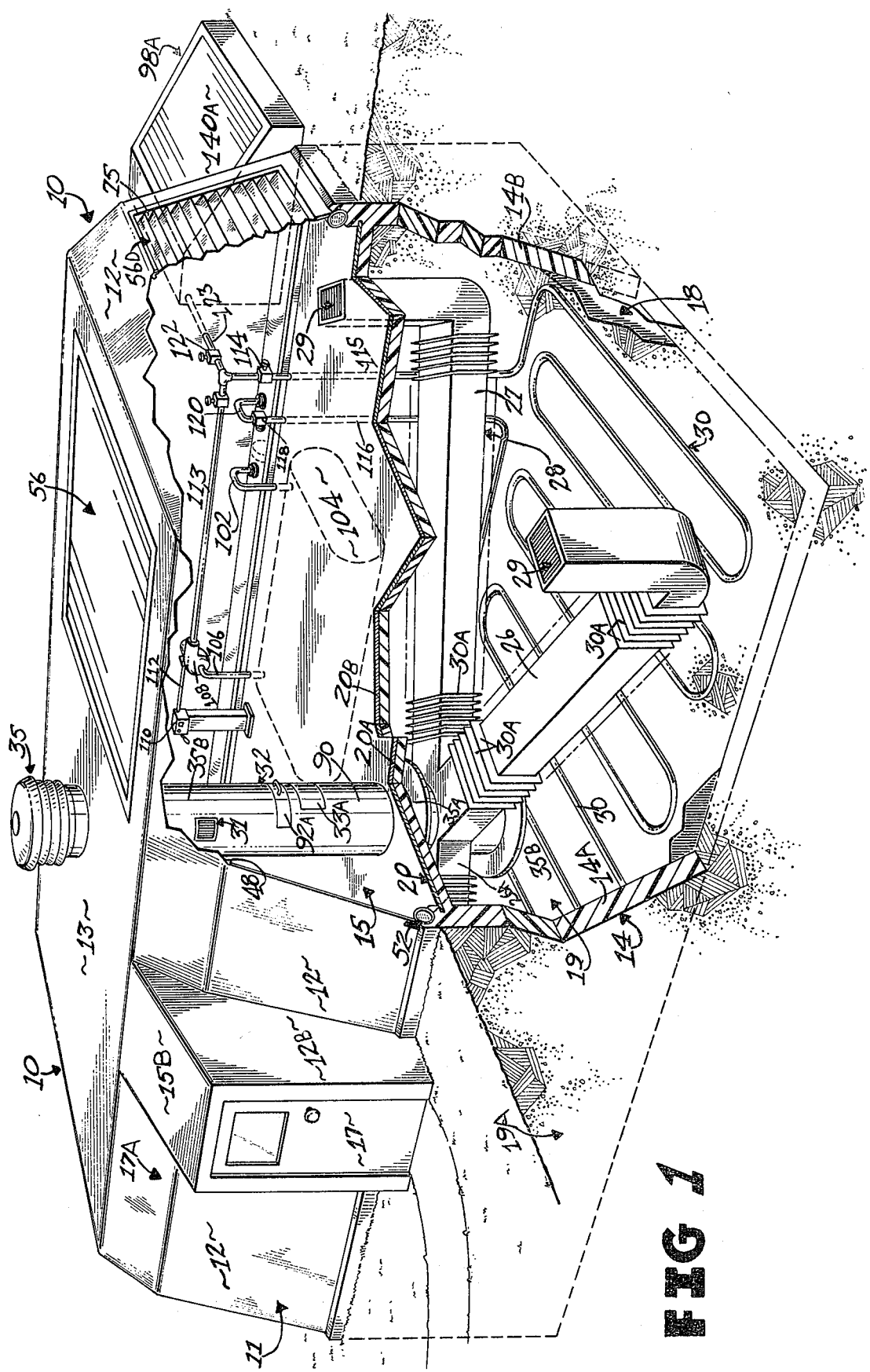
FIG. 1 is a perspective view of an inhabitable enclosure constructed in accordance with the teachings of this invention, with parts thereof broken away or shown in section for clarity.

Referring initially to FIGS. 1 and 2, thereshown is an upright, generally cubicle enclosure 10 suitable for human habitation. The enclosure preferably comprises an upper shelter structure 11 comprised of walls 12 and roof 13, and a lower, substantially buried foundation 14 which provides support for the shelter. The shelter 11 defines an internal living space 15 which is environmentally controlled through the use of both geothermal and solar energy. Of course living space 15 may be subdivided into a plurality of separate rooms as desired. A greenhouse barrier 16 (FIG. 2) between walls 12 and the outside may be formed by a translucent sheet 16A to help insulate interior 15 during the colder seasons. Access to the shelter may be achieved via a conventional door 17, at the front of a passageway 17A comprised of an upper roof portion 13B and side wall portions 12B respectively intersecting main roof 13 and walls 12.

Foundation 14 preferably comprises a plurality of intersecting walls 14A-14D which may be comprised of a thermally insulative material such as styrofoam, urethane foam or the like. The foundation walls are disposed within a trench 18 which must be excavated prior to enclosure erection by suitable conventional methods. An underground heat exchange region 19 is dividably defined by the foundation, and is thus isolated from surrounding ground 19A. It will be apparent that foundation 14 may alternatively be circular, or take on a variety of shapes and configurations different from that illustrated herein.

Geothermal heat exchangers 28 and 30 are preferably buried within region 19 for exchanging heat between shelter interior 15 and the ground within region 19. Floor 20 insulates the shelter interior from region 19, as well as providing an internal supportive surface. The floor preferably comprises a lower, planar layer 20A comprised of thermally insulative material such as polyurethane foam or the like, similar to fundation 14. The floor also comprises an upper floor surface 20B comprised of conventional materials such as wood or the like.

Heat exchanger 28 preferably comprises a pair of intersecting elongated, metallic duct tubes 26 and 27 of generally rectangular cross section which may be constructed utilizing conventional sheet metal techniques well recognized by those skilled in the trade. However, care should be taken to seal exchanger 28 to prevent leakage of water into same from region 19. Each duct may be provided with a plurality of spaced-apart heat exchanger fins 30A for distributing heat. As will be described in more detail later, fluids (preferably air) may be circulated through heat exchanger 28 and shelter interior 15 via vents 29 by fan 33. For example, air may be recirculated through return vents 31; or external fresh air may be drawn into the system through an outside vent such as vent 35. During the warmer summer months cooled air from the heat exchanger will be utilized to air-condition the shelter interior. During the colder months air may be heated (or pre-heated) in a similar fashion. As will be described in more detail later, solar energy may be selectively employed to raise interior temperature to the desired level.

The intersecting heat exchanger ducts 26 and 27 are in fluid flow communication with an elongated, vertically oriented chimney structure 32, which extends upwardly through floor 20 and roof 13. Damper 34 within plenum 34A may be opened to admit fresh air or closed to recirculate room air. It will be apparent to those skilled in the art that with fan 33 "off" and damper 34 "open" the resultant venturi effect will provide a degree of interior ventilation. Access to fan 33 and optional filter 92 is provided through hatches 33A and 92A respectively. Axial displacement of chimney 32 is prevented by a pair of spaced-apart ground anchor disks 35A and 35B which are buried within region 19 to alleviate stresses which may otherwise be encountered by heat exchanger 28.

Heat exchanger 30 is adapted to conduct a liquid such as water or the like within separate underground region 19. Thus, for example, water may be pre-heated with geothermal energy before entering a conventional water heater (not shown). Or, as will be described in more detail later, heated water may be pumped into the liquid anchor structure to help heat interior 15. Heat exchanger 30 is preferably formed from metallic pipe such as copper tubing or the like. Exchanger 30 will be discussed in more detail later.

Figure 3:
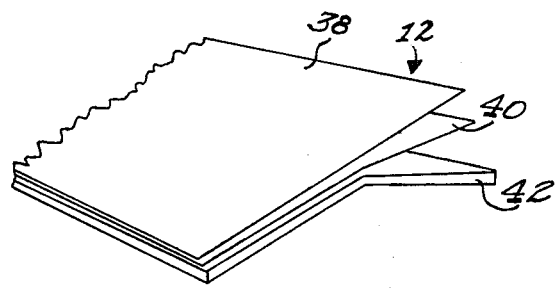
FIG. 3 is a perspective view of a portion of the enclosure wall showing the preferred multilayer construction thereof.
Figure 4:
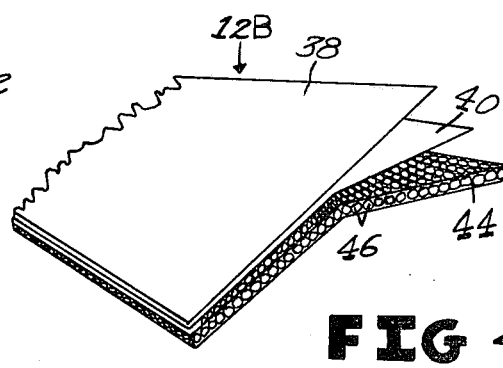
FIG. 4 is a perspective view similar to FIG. 3 but showing an alternative wall embodiment.

Shelter walls 12 are preferably comprised of three (or more) layers of material which are sealed together (FIGS. 3 and 4). In a preferred embodiment the walls comprise an outer layer 38 of translucent, impact-resistant plastic to prevent or minimize damage from hail, wind-born particles and the like. An interior layer 40, preferably comprised of reflective Mylar film, prevents ultraviolet rays from damaging the walls or from entering the enclosure. In the embodiment shown in FIG. 3 the third layer 42 of thick (approximately 40 mil) Tedlar film is included to add strength and rigidity to the walls to minimize sagging or deformation. It will be apparent that reflective layer 40 is sandwiched between layers 38 and 42. In the alternative embodiment depicted in FIG. 4 the third or innermost layer 44 comprises thick "bubble insulation." The latter construction is adapted for colder northern latitudes. Layer 44 is actually comprised of a laminated plastic film having a plurality of tiny air bubbles 46. The material is available under the tradename "AirCap" from Sealed Air Corporation, 19-01 Highway 208, Fair Lawn N.J., 07410. The walls may be suspended by rigid superstructure 48. Alternatively the shelter may be maintained erect through interior air pressure.

As best seen in FIG. 5 the upper regions of the foundation are provided wth a pre-formed channel 50 for matingly receiving a liquid anchor structure 52 which contains liquid 51. The liquid anchor secures the shelter in proper position on top of the foundation, and is preferably in the form of an elongated tube 53 which nests within channel 50 and is sealed to prevent leakage. An optional outer layer 54 may be formed to define a passageway 55 through which air may be forced to heat or cool the interior. When liquid 51 is heated, warmed air within passageway 55 may rise and enter the shelter interior through vents 56A. By locating the liquid anchor within foundation channels 50 ease of construction as well as structural integrity are assured.

It has been found desirable to facilitate construction of enclosure 10 through the apparatus shown in FIG. 6. A tongue structure 57, attached to one of the wall 12C or liquid anchor 52A, is adapted to be coupled to a receptive groove structure 58 simply by manipulating a "zipper" apparatus 59. Tongue 57 comprises an elongated portion 57A of circular cross section integral with a tab 57B. Tab 57B is preferably glued to anchor wall segment 52E, but may alternatively be formed integrally therewith. Groove structure 58 preferably comprises an elongated, channeled portion 58A of semicircular cross section integral with flat segment 58B attached as by gluing or the like to wall portion 12E. By grasping and moving handle 59A one may slide zipper portion 59B so that groove 57A will be forced into mating engagement with channel 58A. Structural permanence may be facilitated through gluing. In this manner the enclosure walls may be secured to the anchor structure, the roof, and/or to one another. Thus multiple independent wall portions, for example, may be joined together in this manner for convenience of construction.

Figure 7:
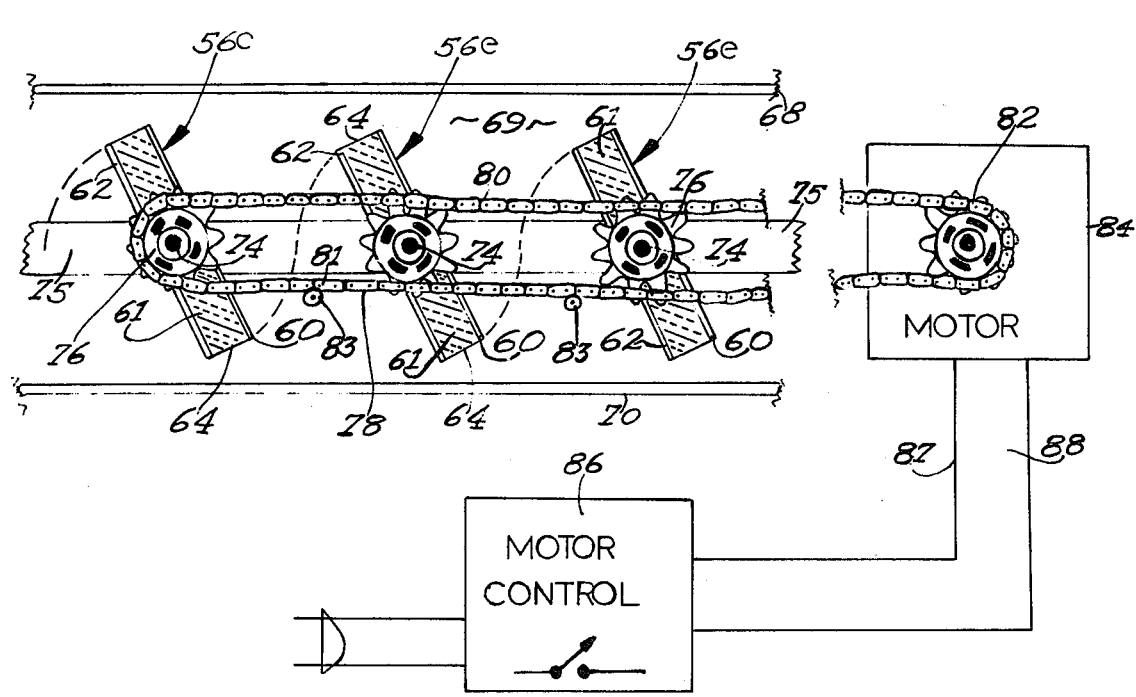
FIG. 7 is a diagrammatic, sectional view of the variable blinds illustrated in an "open" position and showing one form of motor and linkage for actuating same.

Solar energy may be selectively employed for interior heating and/or illumination through a plurality of variably positionable blinds 56 (FIGS. 1 and 7). The blinds may be utilized in the enclosure roof or in any of the walls, but are preferably oriented toward the south (for enclosures in the Northern Hemisphere). In FIG. 1 the blinds 56 provided in the roof are illustrated in a closed position, whereas blinds 56D in the wall are partially open.

The construction of the blinds is illustrated in detail in FIG. 7. Each blind 56E thereshown preferably comprises an elongated panel of generally rectangular cross section. The thicker center portion 61 is preferably comprised of a thermally insulative material such as styrofoam, polyurethane foam or the like. A thin reflective layer 60 comprised of Mylar plastic or the like is secured to portion 61 at a first side thereof by gluing or the like. Oppositely disposed layer 62, of substantially black coloration, is also affixed to layer 61. Blinds 56E are illustrated in an open position in which sunlight and solar energy may be admitted into the shelter interior. However, it will be appreciated that the blinds are also positionable in either of two generally horizontal positions. When rotated to a closed position blind ends 64 will securely abut one another to insure complete sunlight blocking. In the hotter summer months it is contemplated that blind layer 60 will be aimed toward the sun to reflect unwanted energy. The colder weather the black, heat absorbent layers 62 will be positioned outwardly to utilize solar energy for the generation of heat.

The blinds may be isolated by a pair of translucent shields 68 and 70. Shield 68 may be positioned over (or outwardly from) the blinds to prevent contamination from rain, snow and the like. When the blinds are positioned to absorb energy, as when layer 62 is turned toward the sun, heated air will be confined within the shelter by shield 68. The lower, translucent shield 70 to help confine heated air and to prevent entry of rain or the like into the interior. When both shields are employed in this manner the blinds will be substantially isolated within a region 69, through which air may be circulated to aid in warming the enclosure interior 15.

Each blind is preferably supported by an elongated axle 74 which extends between oppositely disposed mandrels or bearings for for rotation. The rear of each axle is received within support bar 75 forming part of the shelter superstructure. The forward (as viewed in FIG. 7) part of each axle receives a gear 76 rigidly secured thereto. Chain 80 links the various blinds together and to motor 84 via drive gear 82. Commands may be initiated by motor control 86, which is connected to the motor by control lines 87 and 88. Idlers 83 prevent sagging of lower chain segments 81 to prevent disengagement of the chain drive. Control 86, which may be of conventional construction well recognized by those skilled in the art, may be selectively actuated within the shelter by the enclosure inhabitant(s). It will be appreciated that a variety of alternative linkage systems may be employed to actuate the blinds. For example, chain 80 may simply be extended into a convenient location within the shelter interior for manual manipulation.

Figure 8:
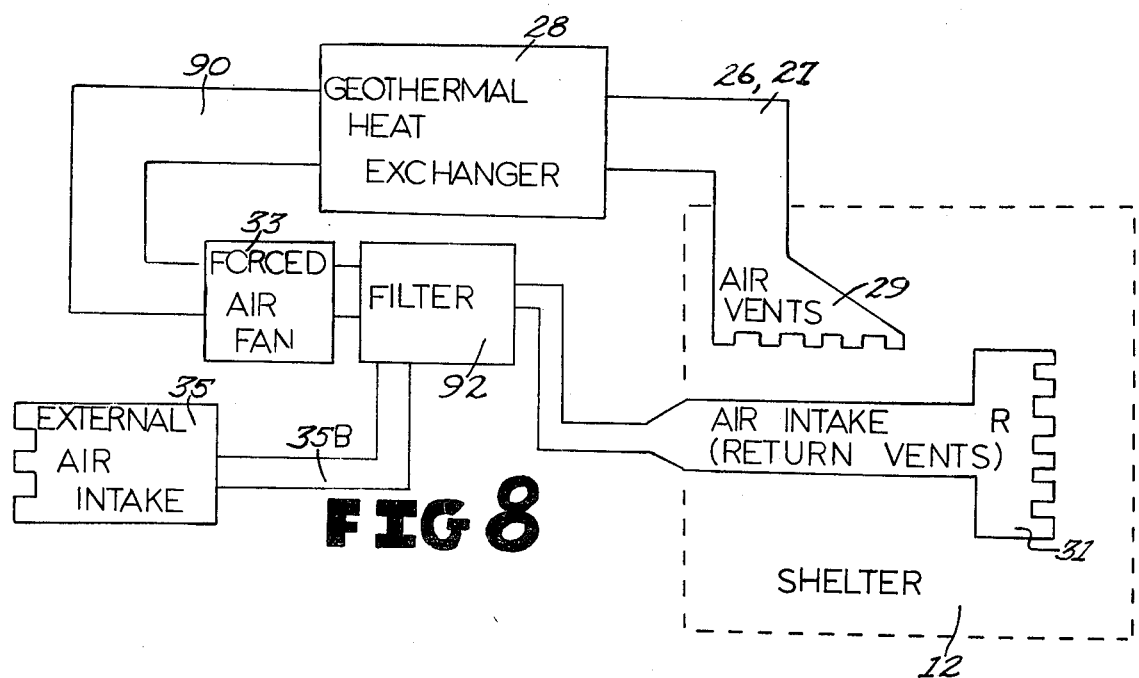
FIG. 8 is a block diagram of the preferred fluid circulation apparatus.

Referring now to FIGS. 1, 2, and 8, the forced-air fan apparatus 33, of conventional construction, drives air (or other fluids) into geothermal heat exchanger 28 through duct 90. Fresh air may be admitted into the system through vent 35 via duct segment 35B, or through optional vents located outside the enclosure. Also, air may be continuously recirculated through intake vents 31. The output of exchanger 28 may be transmitted through vents 29 into the shelter interior, or it may alternatively be directed into the optional anchor passageway 55 (FIG. 5).

Figure 10:
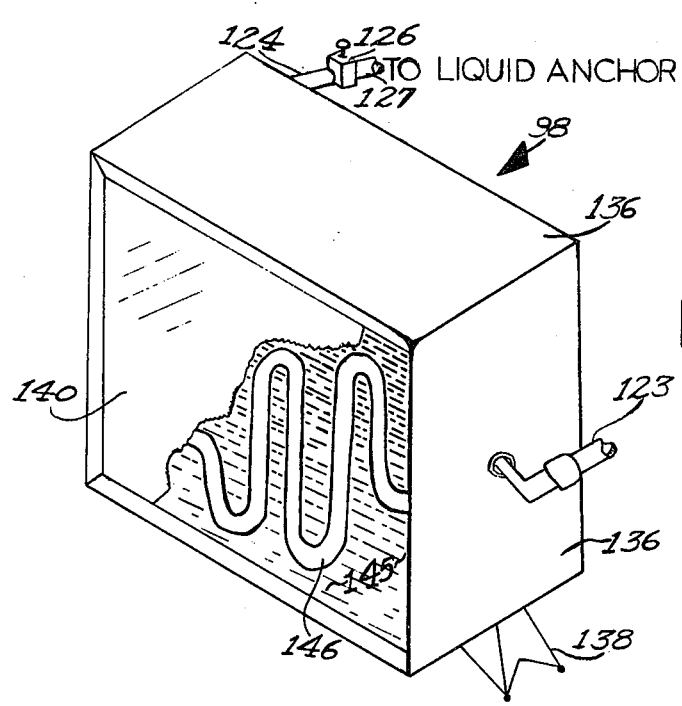
FIG. 10 is a perspective view of one form of a solar water heater suitable for use with this invention, with parts thereof shown in section or broken away for clarity.
Figure 9:
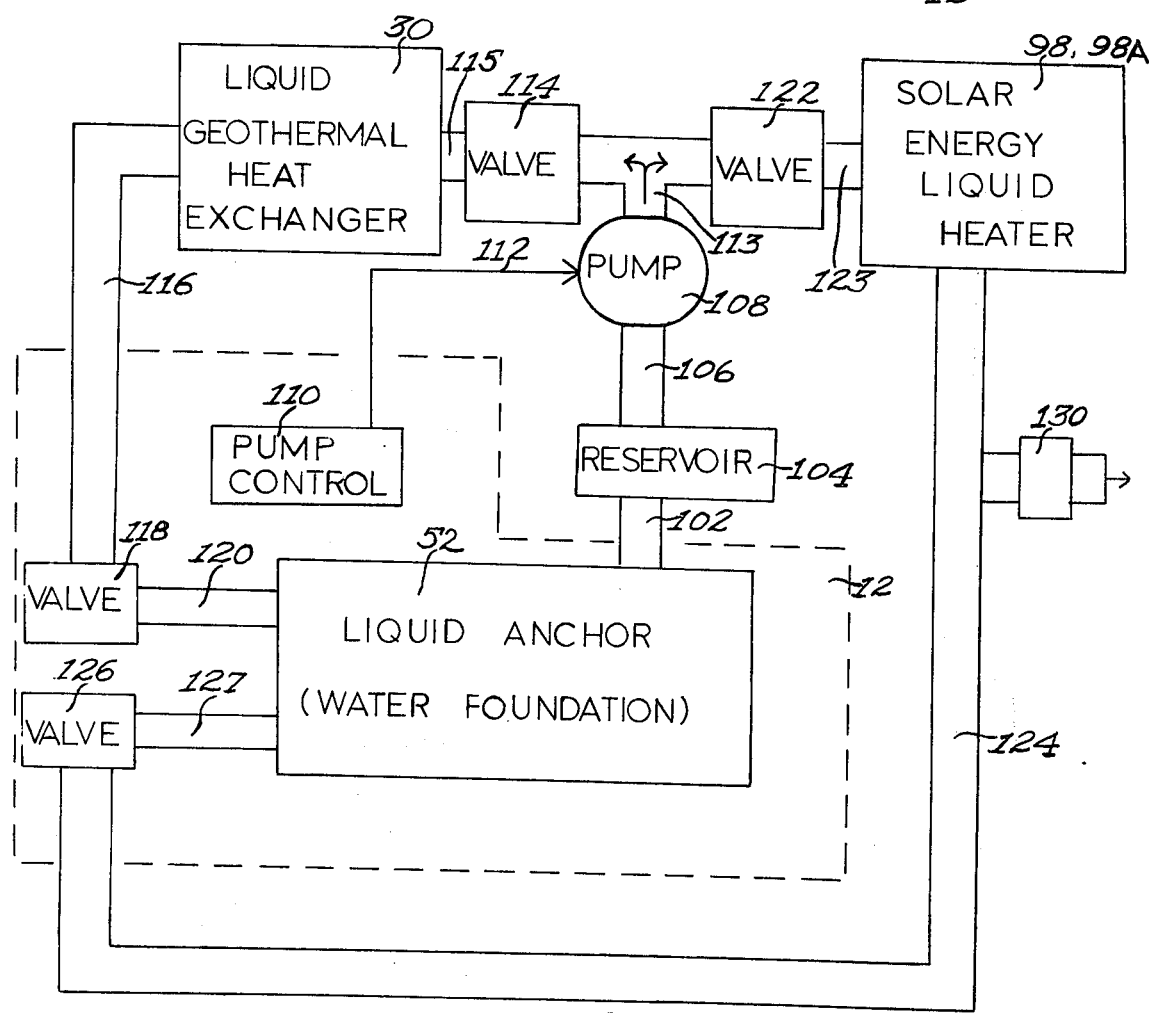
FIG. 9 is a block diagram of the liquid circulation apparatus.

FIG. 9 shows a system for circulating liquid between the liquid anchor 52 and either or both of liquid heat exchanger 30 (buried within underground region 19) and a solar water heater 98A or 98 (FIGS. 1 and 10 respectively). As mentioned earlier, a substantial volume of liquid is stored within liquid anchor 52 to secure same. The interior of the enclosure may be heated or cooled by circulating appropriately treated liquid through the anchor. To this effect water may be withdrawn from the anchor via a pipe 102, which empties into an optional reservoir 104. Pipeline 106 connects the reservoir with a conventional pump 108 which is responsive to control signals from pump control 110 transmitted via line 112. Pump control 110 is located inside the enclosure in a conveniently accessible position. When the pump is actuated water (liquid) directed through pipe 113 may flow into heat exchanger 30 via a valve 114 (if opened) and a pipeline 115. The output of exchanger 30 flows through a pipe 116, an optional valve 118 (if opened), and a return pipe 120 back into the liquid anchor 52.

Liquid outputted by pump 108 may also be directed through a valve 122 (if opened) and a pipe 123 into solar energy water heater 98 or 98A (FIGS. 1 and 9 respectively). Heated water will then flow back into anchor 52 via pipe 124, an optional valve 126 (if opened), and a return pipe 127. An optional valve 130 may be connected to line 124 to provide a source of pre-heated water for a conventional water heater (not shown).

A suitable solar water heater 98 is shown in detail in FIG. 10. Heater 98 is generally cubicle, consisting of a plurality of sides 136 and supported by a rigid stand 138. A generally rectangular, translucent piece of glass or plastic 140 admits sunlight to heat the interiorly disposed liquid 145 therewithin. Heat exchanger pipe 146 within the heater extends in fluid flow communication between pipes 123 and 124, and warms liquid travelling therebetween. Front plate 140 preferably should be aimed in a generally southerly direction (in the Northern Hemisphere) as will be recognized by those skilled in the art. It should be understood that solay powered water heaters of varying designs may be employed successfully with the instant invention. For example, heater 98A (FIG. 1) is somewhat inclined, with its front plate 140A aimed generally toward the sun.

Figure 11:
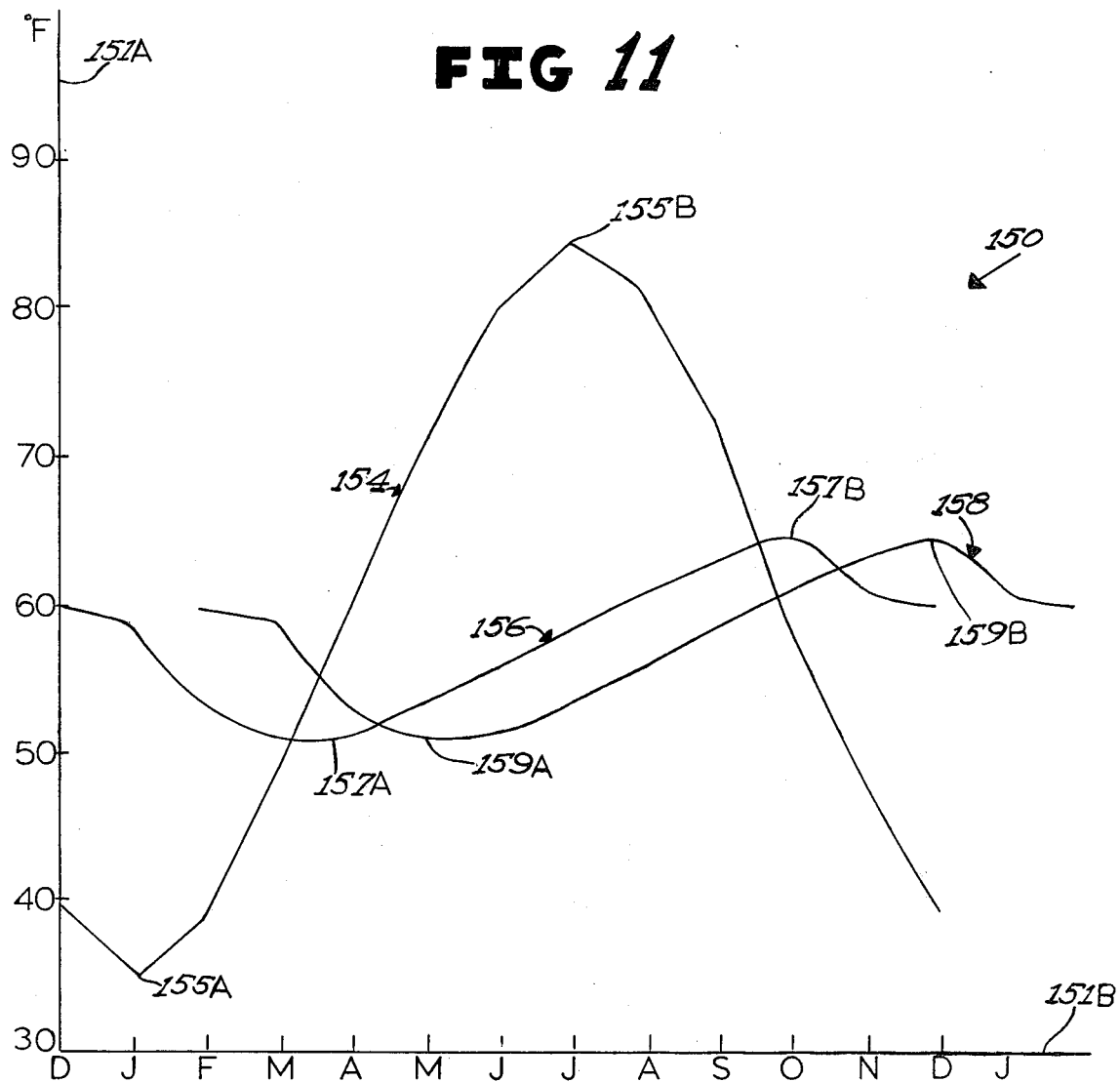
FIG. 11 is a graph showing five year average surface and underground temperature variations for Lexington, Kentucky, and includes a plot of the contemplated temperature variation in the separate, underground heat exchange region utilized and defined by the instant invention.

An important concept of this invention is illustrated in FIG. 11. Thereshown is a graph depicting a five year average of monthly surface and soil (underground) temperatures for Lexington, Kentucky. Trace 154 illustrates the monthly variation of surface temperature, while trace 156 illustrates the corresponding variation in underground temperature at a depth of 10 feet. It will be apparent from an inspection of graph 150 that while the minimum surface temperature 155A (about 35 degrees) occurs in January, the minimum underground temperature 157A (about 50 degrees) does not occur until approximately three months later. The peak surface temperature 155B occurs in July, while the peak underground temperature 157B occurs in late September. This illustrates the well known "time lag" phenomena associated with geothermal energy systems of prior art design.

Graphical trace 158 illustrates contemplated temperature variations within underground region 19. The graph assumes location of the apparatus at Lexington Kentucky. Furthermore, graph trace 158 has been shifted to the right (as viewed in FIG. 11) an exagerated amount for purposes of drafting clarity. Region 19 is substantially bordered on all sides by the thermally non-conductive foundation; thus, it is divided from the outside underground regions 19A. It will be seen that trace 158 lags trace 156. Trace 158 thus lags surface temperature trace 154 by a greater amount of time than trace 156. Thus, it will be apparent that the minimums 159A in temperature within region 19 occur closer in time to the maximums 155B in surface temperature than the underground temperature peaks occurring in outside regions corresponding to region 19A (FIG. 1). Conversely, the maximums 159B in temperatures occurring in underground region 19 occur closer in time to the minimums in outside surface temperatures. Thus the heat exchange apparatus 28 and 30 buried in region 19 are better able to appropriately heat or cool circulated air than they would be had they been located in region 19A. With the disclosed construction the utility of geothermal heating and cooling systems is improved significantly over the prior art.

From the foregoing it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the appended claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An enclosure suitable for human habitation, said enclosure comprising:

foundation means comprised of thermally insulative material for dividably defining an underground geothermal heat exchange region substantially separate from surrounding ground;

shelter means for enclosing an internal living space, said shelter means adapted to be disposed upon said foundation means;

geothermal heat exchanger means disposed within said separate heat exchange region for exchanging heat between said region and said shelter;

fan means for circulating air between said geothermal heat exchanger means and said shelter living space to thereby control internal shelter temperature;

blind means selectively deployable in sunlight admitting and sunlight reflecting positions to thereby facilitate selective internal solar energy use;

transulucent shield means disposed under said blinds for preventing foreign material from entering said shelter; and liquid anchor means for securing said shelter to said foundation.

2. The combination as defined in claim 1 wherein said foundation comprises channel means defined therein for receiving said liquid anchor means.

3. The combination as defined in claim 2 wherein said liquid anchor is in the form of an elongated tube positioned within said foundation channel means.

4. The combination as defined in claim 3 wherein said shelter comprises tongue and groove means for locking said shelter wall to said liquid anchor means.

5. The combination as defined in claim 1 wherein said enclosure comprises means for circulating liquid between said liquid anchor means and said geothermal heat exchanger means for altering shelter temperature.

6. The combination as defined in claim 1 wherein said enclosure comprises translucent shield means disposed over said blind means for preventing foreign material from contacting said blinds and for confining air within said shelter.

7. The combination as defined in claim 1 wherein said enclosure comprises means for heating liquid with solar energy and means for circulating liquid between said solar heating means and said liquid anchor means thereby selectively heating said enclosure with solar energy.

8. The combination as defined in claim 1 wherein said enclosure comprises wall means comprising an outer layer of impact-resistant translucent material, a second layer of material for reflecting away ultraviolet rays for minimizing deterioration, and an inner layer of thermally insulative material.

9. The combination as defined in claim 8 wherein said blind means comprises a heat absorbent layer for capturing solar heat when said blind means is deployed in said sunlight absorbing position, and a reflective layer opposite said heat absorbent layer for selectively reflecting away solar energy when said blind means is deployed in said sunlight reflecting position.

10. The combination as defined in claim 9 wherein said enclosure comprises a supportive frame comprised of a plurality of substantially rigid support members.

11. A method of constructing an inhabitable enclosure, said method comprising the steps of:

defining a separate geothermal heat exchange region by excavating a trench which substantially encircles said region;

constructing a foundation wall from thermally insulative material within said trench, thereby facilitating a temperature variation time lag within said separate region with respect to temperature variations in undergound areas outside of said separate region;

defining a channel within said foundation;

burying heat exchanger means within said separate region;

erecting a shelter over said foundation thereby defining an inhabitable living space;

securing said shelter to said foundation with a liquid anchor;

providing said shelter with wall means substantially surrounding said living space and attached to said liquid anchor;

circulating fluid between said geothermal heat exchanger means and said shelter to thereby regulate internal shelter temperature; and circulating liquid between said liquid anchor and said geothermal heat exchanger means to regulate internal shelter temperature.

12. The method as defined in claim 11 including the step of providing said shelter wall means with an outer layer of impact resistant translucent material, a second layer of reflective material for reflecting ultraviolet rays for minimizing deterioration of interior elements, and an inner layer of thermally insulative material.

13. The method as defined in claim 11 including the steps of providing said shelter with a plurality of adjustable blinds deployable in sunlight admitting, solar energy absorbing, and solar energy reflecting positions to facilitate selective solar heating and lighting internally of said shelter.

14. The method as defined in claim 13 including the step of suspending a translucent shield under said blinds to prevent foreign materials from entering said shelter.

15. The method as defined in claim 13 including the step of suspending a translucent shield over said blinds to prevent foreign materials from entering said shelter and to prevent the escape of heated air.

16. The method as defined in claim 13 including the step of providing said blinds with a substantially black, heat absorbent layer for capturing solar heat when said blinds are deployed in said solar energy absorbing position, and a reflective layer for selectively reflecting away solar energy when said blinds are deployed in said solar energy reflecting position.

17. The method as defined in claim 11 including the step of isolating said shelter within a greenhouse barrier to thereby provide a solar heated barrier between said shelter and the outdoors.

18. A method of constructing an inhabitable enclosure, said method comprising the steps of:

defining a separate geothermal heat exchange region by excavating a trench which substantially encircles said region;

constructing a foundation wall from thermally insulative material within said trench, thereby facilitating a temperature variation time lag within said separate region with respect to temperature variations in underground areas outside of said separate region;

defining a channel within said foundation;

burying heat exchanger means within said separate region;

erecting a shelter over said foundation thereby defining an inhabitable living space;

securing said shelter to said foundation with a liquid anchor;

providing said shelter with wall means substantially surrounding said living space and attached to said liquid anchor;

circulating fluid between said geothermal heat exchanger and said shelter to regulate temperature; and circulating liquid between said liquid anchor and an externally located solar energy powered liquid heater to thereby regulate internal shelter temperature.

19. The method as defined in claim 18 including the step of providing said shelter wall means with an outer layer of impact resistant translucent material, a second layer of reflective material for reflecting ultraviolet rays for minimizing deterioration of interior elements, and an inner layer of thermally insulative material.

20. The method as defined in claim 18 including the steps of providing said shelter with a plurality of adjustable blinds deployable in sunlight admitting, solar energy absorbing, and solar energy reflecting positions to facilitate selective solar heating and lighting internally of said shelter.

21. The method as defined in claim 20 including the step of suspending a translucent shield under said blinds to prevent foreign materials from entering said shelter.

22. The method as defined in claim 20 including the step of suspending a translucent shield over said blinds to prevent foreign materials from entering said shelter and to prevent the escape of heated air.

23. The method as defined in claim 20 including the step of providing said blinds with a substantially black, heat absorbent layer for capturing solar heat when said blinds are deployed in said solar energy absorbing position, and a reflective layer for selectively reflecting away solar energy when said blinds are deployed in said solar energy reflecting position.

24. The method as defined in claim 20 including the step of isolating said shelter within a greenhouse barrier to thereby provide a solar heated barrier between said shelter and the outdoors.

25. An enclosure suitable for human habitation, said enclosure comprising:
foundation means comprised of thermally insulative material for dividably defining an underground geothermal heat exchange region substantially separate from surrounding ground;

shelter means for enclosing an internal living space, said shelter means adapted to be disposed upon said foundation means;

geothermal heat exchanger means disposed within said separate heat exchange region for exchanging heat between said region and said shelter;

fan means for circulating air between said geothermal heat exchanger means and said shelter living space to thereby control internal shelter temperature;

blind means selectively deployable in sunlight admitting and sunlight reflecting positions to thereby facilitate selective internal solar energy use;

translucent shield means disposed under said blinds for preventing foreign material from entering said shelter; and anchor means for securing said shelter to said foundation.

26. The combination as defined in claim 25 wherein said foundation comprises channel means defined therein for receiving said anchor means.

27. The combination as defined in claim 26 wherein said anchor is in the form of an elongated tube positioned within said foundation channel means.

28. The combination as defined in claim 27 wherein said shelter comprises tongue and groove means for locking said shelter wall to said anchor means.

29. The combination as defined in claim 25 wherein said enclosure comprises translucent shield means disposed over said blind means for preventing foreign material from contacting said blinds and for confining air within said shelter.

30. The combination as defined in claim 29 wherein said enclosure comprises wall means comprising an outer layer of impact-resistant translucent material, a second layer of material for reflecting away ultraviolet rays for minimizing deterioration, and an inner layer of thermally insulative material.

31. The combination as defined in claim 29 wherein said blind means comprises a heat absorbent layer for capturing solar heat when said blind means is deployed in said sunlight absorbing position, and reflective layer opposite said heat absorbent layer for selectively reflecting away solar energy when said blind means is deployed in said sunlight reflecting position.

32. The combination as defined in claim 31 wherein said enclosure comprises a supportive frame comprised of a plurality of substantially rigid support members.

* * * * *